(12) United States Patent
Chen et al.

(10) Patent No.: US 8,941,299 B2
(45) Date of Patent: Jan. 27, 2015

(54) LIGHT EMITTING DEVICE INCLUDING SEMICONDUCTOR NANOCRYSTALS

(75) Inventors: Jianglong Chen, Cambridge, MA (US); Vladimir Bulovic, Lexington, MA (US); Polina Anikeeva, Cambridge, MA (US); Moungi G. Bawendi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/750,824

(22) Filed: May 18, 2007

(65) Prior Publication Data

US 2008/0074050 A1    Mar. 27, 2008

Related U.S. Application Data

(60) Provisional application No. 60/747,806, filed on May 21, 2006.

(51) Int. Cl.
- *H01J 1/62* (2006.01)
- *H01J 63/04* (2006.01)
- *C09K 11/56* (2006.01)
- *H05B 33/14* (2006.01)

(52) U.S. Cl.
CPC .............. *C09K 11/565* (2013.01); *H05B 33/14* (2013.01)
USPC ........................................... 313/509; 445/23

(58) Field of Classification Search
CPC ... H05B 33/14; C09K 11/565; H01L 23/3244
USPC .................. 313/498, 506, 509, 503; 977/774; 250/214.1; 362/800; 445/23, 24, 25
See application file for complete search history.

(56) References Cited

U.S. PATENT DOCUMENTS

| | | |
|---|---|---|
| 5,260,957 A | 11/1993 | Hakimi et al. |
| 5,293,050 A | 3/1994 | Chapple-Sokol et al. |
| 5,354,707 A | 10/1994 | Chapple-Sokol et al. |
| 5,422,489 A | 6/1995 | Bhargava |
| 5,505,928 A | 4/1996 | Alivisatos et al. |
| 5,512,131 A | 4/1996 | Kumar et al. |
| 5,525,377 A | 6/1996 | Gallagher et al. |
| 5,537,000 A | 7/1996 | Alivisatos et al. |
| 5,585,640 A | 12/1996 | Huston et al. |
| 5,613,140 A | 3/1997 | Taira |
| 5,677,545 A | 10/1997 | Shi et al. |
| 5,751,018 A | 5/1998 | Alivisatos et al. |

(Continued)

FOREIGN PATENT DOCUMENTS

| | | |
|---|---|---|
| JP | A-2003-217861 | 7/2003 |
| JP | A-2004-296950 | 10/2004 |

(Continued)

OTHER PUBLICATIONS

Adachi et al., "High-efficiency red electrophosphorescence devices", Appl. Phys. Lett. 78, 1622 (2001).

(Continued)

*Primary Examiner* — Nimeshkumar Patel
*Assistant Examiner* — Glenn Zimmerman
(74) *Attorney, Agent, or Firm* — Steptoe & Johnson LLP (57) ABSTRACT

A light emitting device includes an electroluminescent material and semiconductor nanocrystals. The semiconductor nanocrystals accept energy from the electroluminescent material and emit light.

26 Claims, 5 Drawing Sheets

000 cover
001 top electrode
002 dielectric
003 nanocrystal layer
004 wide band gap material
005 dielectric
006 bottom electrode
007 substrate

(56) References Cited

U.S. PATENT DOCUMENTS

| | | | |
|---|---|---|---|
| 5,897,945 A | 4/1999 | Lieber et al. | |
| 5,958,573 A | 9/1999 | Spitler et al. | |
| 6,103,868 A | 8/2000 | Heath et al. | |
| 6,157,047 A | 12/2000 | Fujita et al. | |
| 6,169,359 B1 * | 1/2001 | Sun et al. | 313/503 |
| 6,180,239 B1 | 1/2001 | Whitesides et al. | |
| 6,207,229 B1 | 3/2001 | Bawendi et al. | |
| 6,236,060 B1 | 5/2001 | Chan et al. | |
| 6,251,303 B1 | 6/2001 | Bawendi et al. | |
| 6,294,401 B1 | 9/2001 | Jacobson et al. | |
| 6,322,901 B1 | 11/2001 | Bawendi et al. | |
| 6,379,635 B2 | 4/2002 | O'Brien et al. | |
| 6,447,698 B1 | 9/2002 | Ihara et al. | |
| 6,501,091 B1 | 12/2002 | Bawendi et al. | |
| 6,518,168 B1 | 2/2003 | Clem et al. | |
| 6,576,291 B2 | 6/2003 | Bawendi et al. | |
| 6,607,829 B1 | 8/2003 | Bawendi et al. | |
| 6,608,439 B1 | 8/2003 | Sokolik et al. | |
| 6,617,583 B1 | 9/2003 | Bawendi et al. | |
| 6,759,199 B2 | 7/2004 | Mirkin et al. | |
| 6,797,412 B1 * | 9/2004 | Jain et al. | 428/690 |
| 6,803,719 B1 | 10/2004 | Miller et al. | |
| 6,846,565 B2 | 1/2005 | Korgel et al. | |
| 6,864,626 B1 | 3/2005 | Weiss et al. | |
| 7,160,613 B2 | 1/2007 | Bawendi et al. | |
| 7,229,690 B2 | 6/2007 | Chan et al. | |
| 2001/0005495 A1 | 6/2001 | O'Brien et al. | |
| 2002/0151094 A1 * | 10/2002 | Andriessen | 438/29 |
| 2003/0017264 A1 | 1/2003 | Treadway et al. | |
| 2003/0042850 A1 | 3/2003 | Bertram et al. | |
| 2003/0142944 A1 | 7/2003 | Sundar et al. | |
| 2004/0004982 A1 | 1/2004 | Eisler et al. | |
| 2004/0017834 A1 | 1/2004 | Sundar et al. | |
| 2004/0023010 A1 * | 2/2004 | Bulovic et al. | 428/209 |
| 2004/0091710 A1 | 5/2004 | Bawendi et al. | |
| 2004/0110002 A1 | 6/2004 | Kim et al. | |
| 2004/0135495 A1 | 7/2004 | Wu et al. | |
| 2004/0265622 A1 | 12/2004 | Sadasivan et al. | |
| 2005/0006656 A1 * | 1/2005 | Jain et al. | 257/88 |
| 2005/0057136 A1 * | 3/2005 | Moriya et al. | 313/311 |
| 2005/0069726 A1 * | 3/2005 | Douglas et al. | 428/690 |
| 2005/0206306 A1 | 9/2005 | Perlo et al. | |
| 2005/0230673 A1 | 10/2005 | Mueller et al. | |
| 2005/0236556 A1 | 10/2005 | Sargent et al. | |
| 2005/0238310 A1 * | 10/2005 | Hoshi et al. | 385/129 |
| 2005/0258418 A1 | 11/2005 | Steckel et al. | |
| 2005/0261400 A1 | 11/2005 | Yang et al. | |
| 2006/0019098 A1 | 1/2006 | Chan et al. | |
| 2006/0034065 A1 * | 2/2006 | Thurk | 362/84 |
| 2006/0043361 A1 * | 3/2006 | Lee et al. | 257/40 |
| 2006/0043372 A1 * | 3/2006 | Qiu et al. | 257/72 |
| 2006/0065943 A1 * | 3/2006 | Hill | 257/442 |
| 2006/0138945 A1 * | 6/2006 | Wolk et al. | 313/506 |
| 2006/0157720 A1 | 7/2006 | Bawendi et al. | |
| 2006/0159901 A1 | 7/2006 | Tischler et al. | |
| 2006/0170331 A1 * | 8/2006 | Bertram et al. | 313/498 |
| 2006/0196375 A1 | 9/2006 | Coe-Sullivan et al. | |
| 2007/0001581 A1 * | 1/2007 | Stasiak et al. | 313/498 |
| 2007/0057263 A1 | 3/2007 | Kahen | |
| 2007/0103068 A1 * | 5/2007 | Bawendi et al. | 313/506 |
| 2007/0200492 A1 * | 8/2007 | Cok et al. | 313/506 |
| 2007/0222371 A1 * | 9/2007 | Raychaudhuri et al. | 313/504 |
| 2008/0001167 A1 | 1/2008 | Coe-Sullivan et al. | |
| 2009/0072751 A1 * | 3/2009 | Tischler et al. | 315/169.3 |
| 2010/0032687 A1 * | 2/2010 | Calder et al. | 257/79 |

FOREIGN PATENT DOCUMENTS

| | | |
|---|---|---|
| JP | A-2004-303592 | 10/2004 |
| JP | A-2005-38634 | 2/2005 |
| WO | WO 96/10282 | 4/1996 |
| WO | WO 97/10175 | 3/1997 |
| WO | WO 99/26299 | 5/1999 |
| WO | WO 03/021694 | 3/2003 |
| WO | WO 2005004253 | 1/2005 |
| WO | WO 2005017951 | 2/2005 |
| WO | WO 2005071764 A1 * | 8/2005 |
| WO | WO 2006/047215 | 5/2006 |

OTHER PUBLICATIONS

Aktsipetrov et al. "Generation of reflected second harmonic at semiconductor quantum dots," JETP Letters, vol. 55, No. 8, 435-439 (1992).

Alivisatos, "Perspectives on the Physical Chemistry of Semiconductor Nanocrystals" J. Phys. Chem. 1996(100):13226-13239, 1996.

Baltramiejunas et al., "Rapid Processes of Darkening and Bleaching in CdS Doped Glasses," Superlattices and Microstructures vol. 10, No. 3, 307-310 (1990).

Baltrameyunas et al., "Fast switching of the transmission of light by glasses activated with CdS microcrystals," Sov. Phys. Semicond., vol. 25 No. 2, 164-166 (1991).

Bhargava et al., "Quantum Confined Atoms of Doped ZnO Nanocrystals", Phys. Stat. Sol (b) 229, No. 2, 897-901 (2002).

Bulovic, V. et al., "Transparent light-emitting devices," Nature 1996, 380, 29.

Bulović et al., "Molecular Organic Light-Emitting Devices", Semiconductors and Semimetals 2000, 64, 255 (2000).

Chamarro et al., "Enhancement of Exciton Exchange Interaction by Quantum Confinement in CdSe Nanocrystals," Jpn. J. Appl. Phys, vol. 34, 12-14 (1994).

Chamarro et al., "Size-dependent Electron-Hole Exchange Interaction in CdSe Quantum Dots, II Nuovo Cimento," vol. 17, Nos. 11-12, (1995) 1407-1412.

Chamarro et al., "Enhancement of electron-hole exchange interaction in CdSe nanocrystals; A quantum confinement effect," Physical Review B, vol. 53, No. 3, Jan. 15, 1996-I, 1336-1342.

Chepic et al., "Auger ionization of semiconductor quantum drops in a glass matrix," Journal of Luminescence 47 (1990) 113-127 North-Holland.

Coe et al., "Electroluminescence from single monolayers of nanocrystals in molecular organic devices," Nature 2002, 420, 800-803.

Coe-Sullivan et al., "Large-Area Ordered Quantum-Dot Monolayers via Phase Separation During Spin-Casting", Advanced Functional Materials, 15, 1117-1124 (2005).

Colvin et al., "Light-emitting diodes made from cadmium selenide nanocrystals and a semiconducting polymer" Nature 370(6488):354-357, Aug. 4, 1994.

D'Andrade et al., "Bright White Electrophosphorescent Triple-Emissive Layer Organic Light Emitting Device", MRS Fall Meeting, BB6.2 (2001).

Dabbousi et al., "Electroluminescence from CdSe quantum-dot/polymer composites" Appl. Phys. Lett. 66(11):1316-1318, Mar. 13, 1995.

Dabbousi et al., "(CdSe)ZnS Core-Shell Quantum Dots: Synthesis and Characterization of a Size Series of Highly Luminescent Nanocrystallites", J. Phys. Chem. B. 101, 9463 (1997).

Danek et al., "Synthesis of Luminescent Thin-Film CdSe/ZnSe Quantum Dot Composites Using CdSe Quantum Dots Passivated with an Overlayer of ZnSe" Chem. Mater. 8(1):173-180, 1996.

Diehl, "Fraunhofer LUCOLEDs to replace lamps," III-Vs Rev. 10(1), 1997.

Dirr et al., "Organic Light Emitting Diodes with Reduced Spectral and Spacial Halfwidths", Jpn. J. Appl. Phys. 37, 1457 (1998).

Dneproviskii et al., "Time-Resolved Luminescence of CdSe Microcrystals," Solid State Communications, vol. 74, No. 7, pp. 555-557 (1990).

Edamatsu et al., "Subpicosecond dynamics of confined excitons and optical nonlinearities of CuCl quantum dots," Journal of Luminescence 66 & 67 (1996) 406-409.

Efros et al., "Resonance Raman Spectroscopy of Electron-Hole Pairs—Polar Phonon Coupling in Semiconductor Quantum Microcrystals," Solid State Communications, vol. 78, No. 10, 853-856 (1991).

(56) References Cited

OTHER PUBLICATIONS

Ekimov et al., "Quantum size effect in three-dimensional microscopic semiconductor crystals," JETP Lett, vol. 34, No. 6, Sep. 20, 1981, pp. 345-349.

Ekimov et al., "Quantum size effect in the optical spectra of semiconductor microcrystals," Sov. Phys. Semicond. 16(7), Jul. 1982, pp. 775-778.

Ekimov et al., "Size quantization of the electron energy spectrum in a microscopic semiconductor crystal," JETP Lett., vol. 40, No. 8, Oct. 25, 1984, pp. 1136-1139.

Ekimov et al., "Quantum Size Effect in Semiconductor Microcrystals," Solid State Communications, vol. 56, No. 11, pp. 921-924 (1985).

Ekimov et al., "Quantization of the energy spectrum of holes in the adiabatic potential of the electron," JETP Lett., vol. 43, No. 6, Mar. 25, 1986, pp. 376-379.

Ekimov et al., "Nonlinear Optics of Semiconductor-Doped Glasses," Phys. Stat. Sol. (b) 150, (1988) pp. 627-633.

Ekimov et al., "Photoluminescence of quasizero-dimensional semiconductor structures," Sov. Phys. Solid State 31(8), Aug. 1989, pp. 1385-1393.

Ekimov et al., "Donor-like Exciton in Zero-Dimension Semiconductor Structures," Solid State Communications, vol. 69, No. 5, pp. 565-568 (1989).

Ekimov et al., "Influence of high hydrostatic pressures on the exciton spectrum of CdS microcrystals in glass," Sov. Phys. Semicond. 23(9), Sep. 1989, pp. 965-966.

Ekimov et al., "Quantum-Size Stark Effect in Semiconductor Microcrystals," Journal of Luminescence 46 (1990) 97-100 North-Holland.

Ekimov et al., "Spectra and Decay Kinetics of Radiative Recombination in CdS Microcrystals," Journal of Luminescence 46 (1990) 83-95 North-Holland.

Ekimov et al., "Optics of Zero Dimensional Semiconductor Systems, Acta Physica Polonica A," vol. 79 (1991), No. 1. pp. 5-14.

Ekimov, "Optical Properties of Semiconductor Quantum Dots in Glass Matrix," Physica Scripta, vol. T39, 217-222 (1991).

Ekimov et al., "Dimensional Effects in Luminescence Spectra of Zero-Dimensional Semiconductor Structures," Bulletin of the Russian Academy of Sciences, vol. 56, No. 2, pp. 154-157 (Feb. 1992).

Ekimov et al., "Absorption and intensity-dependent photoluminescence measurements on CdSe quantum dots: assignment of the first electronic transitions," Journal of the Optical Society of America, vol. 10, Nos. 1-12, 100-107 (1992).

Ekimov et al., "Growth of CdSe nanocrystals in ion-implanted $SiO_2$ films," Journal of Crystal Growth 151 (1995) 38-45.

Ekimov, "Optical Properties of Oxide Glasses Doped by Semiconductor Nanocrystals," Radiation Effects and Defects in Solids, 1995, vol. 134, 11-22.

Ekimov, "Growth and optical properties of semiconductor nanocrystals in a glass matrix," Journal of Luminescence 70 (1996) 1-20.

Empedocles et al, "Photoluminescence Spectroscopy of Single CdSe Nanocrystallite Quantum Dots" Phys. Rev. Lett. 77(18):3873-3876 (Oct. 1996).

Empedocles et al., "Quantum-Confined Stark Effect in Single CdSe Nanocrystallite Quantum Dots" Science 278:2114-2117 (Dec. 1997).

Grabovskis, et al., "Photoionization of semiconducting microcrystals in glass," Sov. Phys. Solid State 31(1), Jan. 1989, pp. 149-151.

Gu et al., "Transparent Organic Light Emitting Devices," *Appl. Phys. Lett.* 1996, 68, 2606-2608.

Guha et al., "Hybrid organic-inorganic semiconductor-based light-emitting diodes" J. Appl. Phys. 82(8):4126-4128 (Oct. 15, 1997).

Gurevich et al., "Growth of CdS nanocrystals in silicate glasses and in thin $SIO_2$ films in the Initial states of the phase separation of a solid solution," Semiconductors, 28 (5), May 1994, 486-493.

Gurevich et al. "Preparation and investigation of $SIO_2$ films activated by CdS semiconductor nanocrystals," Soviet Physics Semiconductors, vol. 26, 57-59 (1992).

Hines et al., "Synthesis and Characterization of Strongly Luminescing ZnS-Capped CdSe Nanocrystals" J. Phys. Chem. 100:468-471 (Jan. 1996).

ITOH et al., "Interface effects on the properties of confined excitons in CuCl microcrystals," Journal of Luminescence 60 & 61 (1994) 396-399.

Itoh et al., "Polaron and Exciton-Phonon Complexes in CuCl Nanocrystals," Physical Review Letters, vol. 74, No. 9, Feb. 27, 1995, 1645-1648.

Itoh et al., "Subpicosecond dynamics of confined excitons in CuCl nanocrystals," Materials Science and Engineering A217/218 (1996) 167-170.

Jursenas et al., "Surface Recombination of Nonequilibrium Electron-Hole Plasma in Laser-Modified Semiconductor-Doped Glasses," Solid State Communications, vol. 87, No. 6, 577-580 (1993).

Kagan et al., "Electronic Energy Transfer in CdSe Quantum Dot Solids," Physical Review Letters, 76:1517-1520 (1996).

Kagan et al., "Long-range resonance transfer of electronic excitations in close-packed CdSe quantum-dot solids," Physical Review Letters, 54:8633-8643 (Sep. 15, 1996).

Kortan et al., "Nucleation and Growth of CdSe on ZnS Quantum Crystallite Seeds, and Vice Versa, in Inverse Micelle Media" J. Am Chem. Soc. 112:1327-1332 (1990).

Kuno et al., "The band edge luminescence of surface modified CdSe nanocrystallites: Probing the luminescing state" J. Chem. Phys. 106(23):9869-9882 (Jun. 1997).

Lawless et al., "Bifunctional Capping of CdS Nanoparticles and Bridging to TiO2" J. Phys. Chem. 99:10329-10335 (1995).

Leatherdale et al., "Photoconductivity in CdSe Quantum Dot Solids," vol. 62, No. 4, pp. 2669-2680, (Jul. 15, 2000).

Lublinskaya et al., "CdS nanocrystal growth in thin silica films: evolution of size distribution function", Journal of Crystal Growth 184/185 (1998) 360-364.

Matsumoto et al., "Preparation of Monodisperse CdS Nanocrystals by Size Selective Photocorrosion", J. Phys. Chem. 100(32):13781-13785 (1996).

Mattoussi et al., "Electroluminescence from heterostructures of poly(phenylene vinylene) and inorganic CdSe nanocrystals," J. Appl. Phys. 83(12): 7965-7974, 1998.

Murray et al., "Synthesis and Characterization of Nearly Monodisperse CdE (E=S, Se, Te) Semiconductor Nanocrystallites", J. Am. Chem. Soc. 115(19):8706-8715 (1993).

Nirmal et al., "Fluorescence Intermittency in single Cadmium Selenide Nanocrystals" Nature 383:802-804 (Oct. 1996).

Saviot et al., "Effects of Resonance on Low-Frequency Raman Scattering From Semiconductor Nanocrystals," Radiation Effects and Defects in Solids, 1995, vol. 137, 45-50.

Saviot et al., "Size dependence of acoustic and optical vibrational modes of CdSe nanocrystals in glasses," Journal of Non-Crystalline Solids 197 (1996) 238-246.

Saviot et al., "Size-selective resonant Raman scattering in CdS doped glasses," Physical Review B, vol. 57, No. 1, Jan. 1, 1998-I, 341-346.

Schlamp et al., "Improved efficiencies in light emitting diodes made with CdSe(CdS) core/shell type nanocrystals and a semiconducting polymer", J. Appl. Phys., 82, 5837-5842 (1997).

Sirenko et al., "Spin-flip and acoustic-phonon Raman scattering in CdS nanocrystals", Physical Review B, vol. 58, No. 4, 15 (Jul. 1998-II), 2077-2087.

Spanhel et al., "Photochemistry of Colloidal Semiconductors. Surface Modification and Stability of Strong Luminescing CdS Particles" J. Am. Chem. Soc.109(19):5649-5655 (1987).

Tamulaitis et al., "Dynamics of Nonlinear Optical Response of CuBr-Doped Glasses," Superlattices and Microstructures, vol. 3, No. 2, 199-202 (1993).

Tischler et al., "Strong Coupling in a Microcavity LED" Phys. Rev. Lett. 2005, 95, 036401.

Valenta et al., "Dynamics of excitons in CuBr nanocrystals: Spectral-hole burning and transient four-wave-mixing measurements," Physical Review B, vol. 57, No. 3, Jan. 15, 1998-I, 1774-1783.

(56) References Cited

OTHER PUBLICATIONS

Vandyshev et al., "Nonlinear optical properties of semiconductor microcrystals," JETP Lett., vol. 46, No. 10, Nov. 25, 1987 pp. 435-439.
Volkov et al., "Oscillations of polarization of recombination radiation of a variable gap semiconductor in a magnetic field," JETP Lett., vol. 25 No. 55, 526-528 (1977).
Yamasaki et al., "Organic light-emitting device with an ordered monolayer of silica microspheres as a scattering medium", Appl. Phys. Lett. 76, 1243-1245 (2000).
Yu et al., "Complex admittance measurements of polymer light-emitting electrochemical cells: Ionic and electronic contributions," *Applied Physics Letters* 1998, 73, 111-113.

\* cited by examiner

LIGHT EMITTING DEVICE INCLUDING SEMICONDUCTOR NANOCRYSTALS

CLAIM OF PRIORITY

This application claims priority to provisional U.S. Patent Application No. 60/747,806, filed May 21, 2006, which is incorporated by reference in its entirety.

FEDERALLY SPONSORED RESEARCH OR DEVELOPMENT

This invention was made with government support under grant number DMR0213282 awarded by the National Science Foundation and grant number FA9550-04-1-0462 awarded by the Air Force. The U.S. Government has certain rights in this invention.

TECHNICAL FIELD

The present invention relates to light emitting devices including semiconductor nanocrystals.

BACKGROUND

Light-emitting devices can be used, for example, in displays (e.g., flat-panel displays), screens (e.g., computer screens), and other items that require illumination. Accordingly, the brightness of the light-emitting device is an important feature of the device. Also, low operating voltages and high efficiencies can improve the viability of producing emissive devices. In many applications, long device lifetime is desirable.

Light-emitting devices can release photons in response to excitation of an active component of the device. Emission can be stimulated by applying a voltage across the active component (e.g., an electroluminescent component) of the device. The electroluminescent component can be a polymer, such as a conjugated organic polymer or a polymer containing electroluminescent moieties or layers of organic molecules. Typically, the emission can occur by radiative recombination of an excited charge between layers of a device. The emitted light has an emission profile that includes a maximum emission wavelength, and an emission intensity, measured in luminance (candelas/square meter ($cd/m^2$) or power flux ($W/m^2$)). The emission profile, and other physical characteristics of the device, can be altered by the electronic structure (e.g., energy gaps) of the material. For example, the brightness, range of color, efficiency, operating voltage, and operating half-lives of light-emitting devices can vary based on the structure of the device.

SUMMARY

In general, a light emitting device can include a plurality of semiconductor nanocrystals. Semiconductor nanocrystals can be inorganic semiconductor particles, for example, 1-15 nm in diameter, optionally decorated with organic ligands. Nanocrystals can show strong quantum confinement effects that can be harnessed in designing bottom-up chemical approaches to create complex heterostructures with electronic and optical properties that are tunable with the size and composition of the nanocrystals.

Semiconductor nanocrystals can be used as an emissive material in a light emitting device. Because semiconductor nanocrystals can have narrow emission linewidths, can be photoluminescent efficient, and emission wavelength tunable, they can be a desirable emissive material. Semiconductor nanocrystals can be dispersed in a liquid and are therefore compatible with thin-film deposition techniques such as spin-casting, drop-casting, and dip coating.

Semiconductor nanocrystals can be deposited on a substrate using microcontact printing. Advantageously, microcontact printing allows micron-scale or nano-scale (e.g., less than 1 mm, less than 500 µm, less than 200 µm, less than 100 µm, less than 25 µm, or less than 1 µm) patterning of features on a surface. In particular, a monolayer of semiconductor nanocrystals can be deposited by microcontact printing. In other examples, a multilayer of semiconductor nanocrystals can be deposited on a surface by ink jet printing, spin coating, dip coating, microcontact printing or other methods. The multilayer can be less than 3 microns thick, less than 2 microns thick, or less than 1 micron thick. This approach can allow a substantially dry (i.e., substantially solvent-free) application of a patterned semiconductor nanocrystal film on a substrate. A wider variety of substrates can thus be used, because the choice of substrate can be freed from constraints imposed by solubility and surface chemistry requirements.

A voltage driven electroluminescence device can have a sandwich structure in which a first electrode, a first insulator layer, a wide band-gap material (which acts as the electroluminescence light emitting layer), a second insulator layer, and a second electrode layer are stacked on an insulating substrate. To emit light of different colors, the wide band-gap material must be doped with dopants to form active color centers. One disadvantage associated with this structure is the difficulty of engineering layer composition, including dopant type and concentration, to emit red, green and blue light side by side.

When semiconductor nanocrystals are included in a voltage driven light emitting device, the device can produce light of a desired color or colors. Multiple devices that emit different colors of light can be easily produced side by side with little or no change to material processing conditions used in device fabrication.

In one aspect, a light emitting device includes a first electrode, a second electrode, an electroluminescent material, a dielectric material disposed between the electroluminescent material and at least one electrode, and a plurality of semiconductor nanocrystals arranged to receive energy from the electroluminescent material.

In another aspect, a method of forming a device includes depositing a dielectric material over a first electrode, depositing an electroluminescent material over the first electrode, depositing of plurality of semiconductor nanocrystals in an arrangement to receive energy from the electroluminescent material, and arranging a second electrode over the first electrode, the dielectric material, the electroluminescent material, and the plurality of semiconductor nanocrystals. The dielectric material is disposed between the electroluminescent material and at least one electrode.

Dispersing the plurality of semiconductor nanocrystals among the electroluminescent material can include dissolving the plurality of semiconductor nanocrystals and the electroluminescent material in a solvent. Depositing of plurality of semiconductor nanocrystals in an arrangement to receive energy from the electroluminescent material can include depositing the nanocrystals over the first electrode.

In another aspect, a method of generating light includes providing a device including a first electrode, a second electrode, an electroluminescent material, a dielectric material disposed between the electroluminescent material and at least one electrode, and a plurality of semiconductor nanocrystals arranged to receive energy from the electroluminescent material, and applying a light-generating potential across the first electrode and the second electrode.

The plurality of semiconductor nanocrystals can be disposed between the first electrode and the second electrode.

The electroluminescent material can be arranged in a layer. The dielectric material can be arranged in at least one layer adjacent to the electroluminescent material. The plurality of semiconductor nanocrystals can be arranged in a layer, which can optionally be adjacent to the electroluminescent material. The plurality of semiconductor nanocrystals can be dispersed among the electroluminescent material.

The plurality of semiconductor nanocrystals can be selected to emit a single color of light, or to emit more than one different colors of light. The plurality of semiconductor nanocrystals can be selected to emit white light. The plurality of semiconductor nanocrystals can be selected to emit visible light or infrared light.

Other features, objects, and advantages of the invention will be apparent from the description and drawings, and from the claims.

DETAILED DESCRIPTION

A light emitting device can include two or more layers separating two electrodes of the device. The layers can include a dielectric layer interposed between the electrodes and an emissive layer. When a voltage is applied across the electrodes, excitons can be formed on an electroluminescent material. The excitons can then recombine to emit light. The electroluminescent material can be selected for its emissive properties, such as emission wavelength or linewidth. The electroluminescent material can be a wide band gap material.

Figure 1:
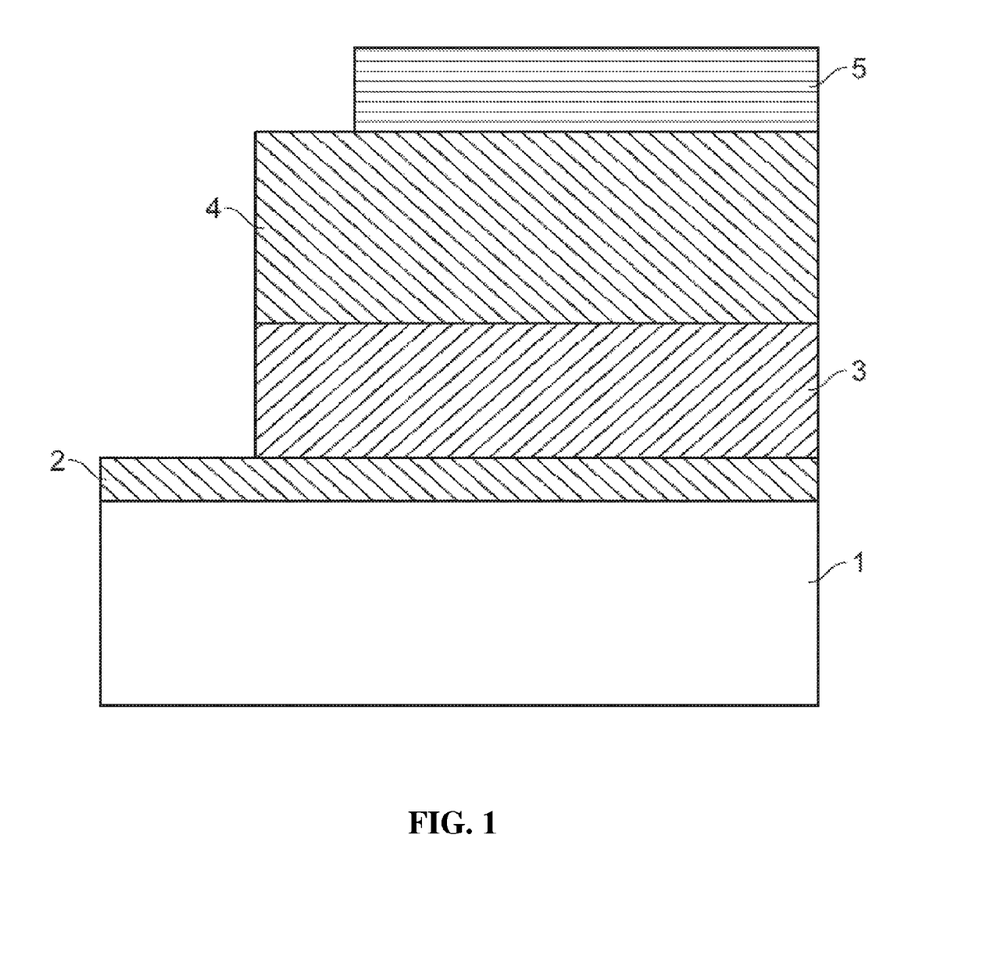
FIG. 1 is a schematic drawing depicting a light-emitting device.

A light emitting device can have a structure such as shown in FIG. 1, in which a first electrode 2, a first layer 3 in contact with the electrode 2, a second layer 4 in contact with the layer 3, and a second electrode 5 in contact with the second layer 4. First layer 3 and second layer 4 can each be an insulating dielectric. One of the electrodes of the structure is in contact with a substrate 1. Each electrode can contact a power supply to provide a voltage across the structure. Electroluminescence can be produced by the emissive layer of the heterostructure when a voltage of proper polarity is applied across the heterostructure. A separate emissive layer (not shown in FIG. 1) can be included between the in the device, for example between first layer 3 and second layer 4. The separate emissive layer can include a wide band gap material.

The substrate can be opaque or transparent. A transparent substrate can be used to in the manufacture of a transparent LED. See, for example, Bulovic, V. et al., *Nature* 1996, 380, 29; and Gu, G. et al., *Appl. Phys. Lett.* 1996, 68, 2606-2608, each of which is incorporated by reference in its entirety. Transparent LEDs can be used in applications such as a head-up display, as on a helmet visor or a vehicle windscreen. The substrate can be rigid or flexible. The substrate can be plastic, metal or glass. The first electrode can be, for example, a high work function hole-injecting conductor, such as an indium tin oxide (ITO) layer. Other first electrode materials can include gallium indium tin oxide, zinc indium tin oxide, titanium nitride, or polyaniline. The second electrode can be, for example, a low work function (e.g., less than 4.0 eV), electron-injecting, metal, such as Al, Ba, Yb, Ca, a lithium-aluminum alloy (Li:Al), or a magnesium-silver alloy (Mg:Ag). The second electrode, such as Mg:Ag, can be covered with an opaque protective metal layer, for example, a layer of Ag for protecting the cathode layer from atmospheric oxidation, or a relatively thin layer of substantially transparent ITO. The first electrode can have a thickness of about 500 Angstroms to 4000 Angstroms. The first layer can have a thickness of about 50 Angstroms to about 5 micrometers, such as a thickness in the range of 100 Angstroms to 100 nm, 100 nm to 1 micrometer, or 1 micrometer to 5 micrometers. The second layer can have a thickness of about 50 Angstroms to about 5 micrometers, such as a thickness in the range of 100 Angstroms to 100 nm, 100 nm to 1 micrometer, or 1 micrometer to 5 micrometers. The second electrode can have a thickness of about 50 Angstroms to greater than about 1000 Angstroms.

A dielectric layer can include a material selected for its insulating properties and compatibility with device manufacturing procedures. Some exemplary dielectric materials include, without limitation, a metal oxide (e.g., a silicon oxide), and a wide band gap polymer (e.g., polymethylmethacrylate). The emissive layer includes an emissive material, preferably one with a wide band gap. Zinc sulfide, for example, is a suitable material.

In some embodiments, the dielectric material and the emissive material are combined in a single material. For example, crystals of zinc sulfide can be coated or encapsulated in a dielectric material, such as a polymer. These polymer-coated crystals can serve as dielectric and emissive material together in a single material.

The layers can be deposited on a surface of one of the electrodes by spin coating, dip coating, vapor deposition, sputtering, or other thin film deposition methods. The second electrode can be sandwiched, sputtered, or evaporated onto the exposed surface of the solid layer. One or both of the electrodes can be patterned. The electrodes of the device can be connected to a voltage source by electrically conductive pathways. Upon application of the voltage, light is generated from the device.

Advantageously, the inorganic semiconductor can be deposited on a substrate at a low temperature, for example, by sputtering. Sputtering is performed by applying a high voltage across a low-pressure gas (for example, argon) to create a plasma of electrons and gas ions in a high-energy state. Energized plasma ions strike a target of the desired coating material, causing atoms from that target to be ejected with enough energy to travel to, and bond with, the substrate.

Microcontact printing provides a method for applying a material to a predefined region on a substrate. The predefined region is a region on the substrate where the material is selectively applied. The material and substrate can be chosen such that the material remains substantially entirely within the predetermined area. By selecting a predefined region that forms a pattern, material can be applied to the substrate such that the material forms a pattern. The pattern can be a regular pattern (such as an array, or a series of lines), or an irregular pattern. Once a pattern of material is formed on the substrate, the substrate can have a region including the material (the predefined region) and a region substantially free of material. In some circumstances, the material forms a monolayer on the substrate. The predefined region can be a discontinuous region. In other words, when the material is applied to the predefined region of the substrate, locations including the material can be separated by other locations that are substantially free of the material. In other examples, a multilayer of semiconductor nanocrystals can be deposited on a surface by ink jet printing, spin coating, dip coating, microcontact printing or other methods. The multilayer can be less than 3 microns thick, less than 2 microns thick, or less than 1 micron thick.

In general, microcontact printing begins by forming a patterned mold. The mold has a surface with a pattern of elevations and depressions. A stamp is formed with a complementary pattern of elevations and depressions, for example by coating the patterned surface of the mold with a liquid polymer precursor that is cured while in contact with the patterned mold surface. The stamp can then be inked; that is, the stamp is contacted with a material which is to be deposited on a substrate. The material becomes reversibly adhered to the stamp. The inked stamp is then contacted with the substrate. The elevated regions of the stamp can contact the substrate while the depressed regions of the stamp can be separated from the substrate. Where the inked stamp contacts the substrate, the ink material (or at least a portion thereof) is transferred from the stamp to the substrate. In this way, the pattern of elevations and depressions is transferred from the stamp to the substrate as regions including the material and free of the material on the substrate. Microcontact printing and related techniques are described in, for example, U.S. Pat. Nos. 5,512,131; 6,180,239; and 6,518,168, each of which is incorporated by reference in its entirety. In some circumstances, the stamp can be a featureless stamp having a pattern of ink, where the pattern is formed when the ink is applied to the stamp. See U.S. patent application Ser. No. 11/253,612, filed Oct. 21, 2005, which is incorporated by reference in its entirety.

Figure 2:
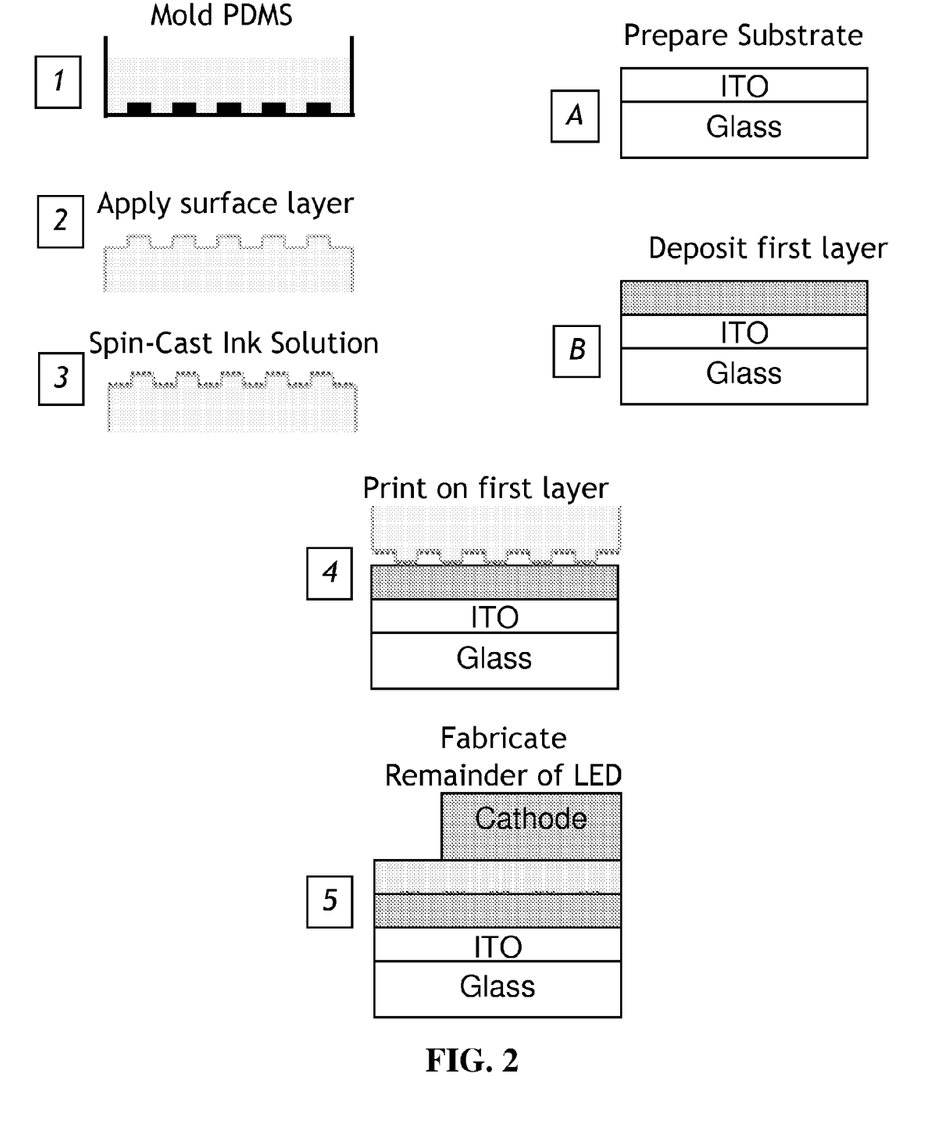
FIG. 2 is a diagram depicting a method of forming a light-emitting device.

FIG. 2 depicts a flow chart outlining the basic steps in the microcontact printing process. First, a silicon master is made using standard semiconductor processing techniques which define a pattern on the silicon surface, for example a pattern of elevations and depressions (alternatively, for a non-patterned deposition, a blank Si master can be used). Poly dimethyl siloxane (PDMS, for example Sylgard 184) precursors are then mixed, degassed, poured onto the master, and degassed again, and allowed to cure at room temperature (or above room temperature, for faster cure times) (step 1). The PDMS stamp, having a surface including the pattern of the silicon master, is then freed from the master, and cut into the desired shape and size. This stamp is then coated with a surface chemistry layer, selected to readily adhere and release the ink as needed. For example, the surface chemistry layer can be a chemical vapor deposited Parylene-C layer. The surface chemistry layer can be, for example, 0.1 to 2 µm thick, depending on the pattern to be reproduced (step 2). This stamp is then inked, for example by spin-casting, syringe pump dispensing, or ink jet printing a solution of semiconductor nanocrystals (step 3). The solution can have, for example, a concentration of 1-10 mg/mL in chloroform. The concentration can be varied depending on desired outcome. The inked stamp can then be contacted to a substrate, and gentle pressure applied for, for example, 30 seconds to transfer the ink (i.e., a semiconductor nanocrystal monolayer) completely to the new substrate (step 4). FIGS. 2A and 2B depict the preparation of an ITO coated glass substrate. A first layer, such as a first dielectric layer, is deposited onto the ITO substrate. The patterned semiconductor nanocrystal monolayer is transferred to this layer, and the rest of the device can then be added (step 5). See, for example, U.S. patent application Ser. Nos. 11/253,595, and 11/253,612, both filed Oct. 21, 2005, and Ser. No. 11/032,163, filed Jan. 11, 2005, each of which is incorporated by reference in its entirety.

The electrical properties (such as band gaps and band offsets) of the device materials can be selected in combination with the device structure to produce a device where excitons are formed substantially on the wide band gap emissive material. The emissive material can transfer energy to an emission-altering material before light is emitted from the device. Energy transfer can occur by emission of light from the emissive material and reabsorption by the emission-altering material. Alternatively, the energy transfer can be a transfer of energy with light emission and reabsorption (such as Forster energy transfer). In either case, once the emission-altering material is in an excited state, it can emit light. In some circumstances, emission and reabsorption can be the primary method of energy transfer. When this is so, the emission-altering material need not be adjacent to the emissive material. The efficiency of Forster energy transfer, however, depends on the distance between the energy transfer partners, with smaller distances giving greater efficiency of energy transfer.

Semiconductor nanocrystals can advantageously be used as an emission-altering material. The semiconductor nanocrystals can have a broad absorption band with an intense, narrow band emission. The peak wavelength of emission can be tuned from throughout the visible and infrared regions, depending on the size, shape, composition, and structural configuration of the nanocrystals. The nanocrystals can be prepared with an outer surface having desired chemical characteristics (such as a desired solubility). Light emission by nanocrystals can be stable for long periods of time.

When a nanocrystal achieves an excited state (or in other words, an exciton is located on the nanocrystal), emission can occur at an emission wavelength. The emission has a frequency that corresponds to the band gap of the quantum confined semiconductor material. The band gap is a function of the size of the nanocrystal. Nanocrystals having small diameters can have properties intermediate between molecular and bulk forms of matter. For example, nanocrystals based on semiconductor materials having small diameters can exhibit quantum confinement of both the electron and hole in all three dimensions, which leads to an increase in the effective band gap of the material with decreasing crystallite size. Consequently, both the optical absorption and emission of nanocrystals shift to the blue, or to higher energies, as the size of the crystallites decreases.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, CdSe can be tuned in the visible region and InAs can be tuned in the infrared region. The narrow size distribution of a population of nanocrystals can result in emission of light in a narrow spectral range. The population can be monodisperse and can exhibit less than a 15% rms deviation in diameter of the nanocrystals, preferably less than 10%, more preferably less than 5%. Spectral emissions in a narrow range of no greater than about 75 nm, preferably 60 nm, more preferably 40 nm, and most preferably 30 nm full width at half max (FWHM) for nanocrystals that emit in the visible can be observed. IR-emitting nanocrystals can have a FWHM of no greater than 150 nm, or no greater than 100 nm. Expressed in terms of the energy of the emission, the emission can have a FWHM of no greater than 0.05 eV, or no greater than 0.03 eV.

The breadth of the emission decreases as the dispersity of nanocrystal diameters decreases. Semiconductor nanocrystals can have high emission quantum efficiencies such as greater than 10%, 20%, 30%, 40%, 50%, 60%, 70%, or 80%.

The semiconductor forming the nanocrystals can include a Group II-VI compound, a Group II-V compound, a Group III-VI compound, a Group III-V compound, a Group IV-VI compound, a Group I-III-VI compound, a Group II-IV-VI compound, or a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

Methods of preparing monodisperse semiconductor nanocrystals include pyrolysis of organometallic reagents, such as dimethyl cadmium, injected into a hot, coordinating solvent. This permits discrete nucleation and results in the controlled growth of macroscopic quantities of nanocrystals. Preparation and manipulation of nanocrystals are described, for example, in U.S. Pat. Nos. 6,322,901 and 6,576,291, and U.S. Patent Application No. 60/550,314, each of which is incorporated by reference in its entirety. The method of manufacturing a nanocrystal is a colloidal growth process. Colloidal growth occurs by rapidly injecting an M donor and an X donor into a hot coordinating solvent. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. The growth temperature necessary to maintain steady growth increases with increasing average crystal size. The nanocrystal is a member of a population of nanocrystals. As a result of the discrete nucleation and controlled growth, the population of nanocrystals obtained has a narrow, monodisperse distribution of diameters. The monodisperse distribution of diameters can also be referred to as a size. The process of controlled growth and annealing of the nanocrystals in the coordinating solvent that follows nucleation can also result in uniform surface derivatization and regular core structures. As the size distribution sharpens, the temperature can be raised to maintain steady growth. By adding more M donor or X donor, the growth period can be shortened.

The M donor can be an inorganic compound, an organometallic compound, or elemental metal. M is cadmium, zinc, magnesium, mercury, aluminum, gallium, indium or thallium. The X donor is a compound capable of reacting with the M donor to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, bis(trimethylsilyl) selenide ((TMS)$_2$Se), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride ((TMS)$_2$Te), bis(trimethylsilyl)sulfide ((TMS)$_2$S), a trialkyl phosphine sulfide such as (tri-n-octylphosphine)sulfide (TOPS), an ammonium salt such as an ammonium halide (e.g., NH$_4$Cl), tris(trimethylsilyl) phosphide ((TMS)$_3$P), tris (trimethylsilyl) arsenide ((TMS)$_3$As), or tris(trimethylsilyl) antimonide ((TMS)$_3$Sb). In certain embodiments, the M donor and the X donor can be moieties within the same molecule.

A coordinating solvent can help control the growth of the nanocrystal. The coordinating solvent is a compound having a donor lone pair that, for example, has a lone electron pair available to coordinate to a surface of the growing nanocrystal. Solvent coordination can stabilize the growing nanocrystal. Typical coordinating solvents include alkyl phosphines, alkyl phosphine oxides, alkyl phosphonic acids, or alkyl phosphinic acids, however, other coordinating solvents, such as pyridines, furans, and amines may also be suitable for the nanocrystal production. Examples of suitable coordinating solvents include pyridine, tri-n-octyl phosphine (TOP), tri-n-octyl phosphine oxide (TOPO) and tris-hydroxylpropylphosphine (tHPP). Technical grade TOPO can be used.

Size distribution during the growth stage of the reaction can be estimated by monitoring the absorption line widths of the particles. Modification of the reaction temperature in response to changes in the absorption spectrum of the particles allows the maintenance of a sharp particle size distribution during growth. Reactants can be added to the nucleation solution during crystal growth to grow larger crystals. By stopping growth at a particular nanocrystal average diameter and choosing the proper composition of the semiconducting material, the emission spectra of the nanocrystals can be tuned continuously over the wavelength range of 300 nm to 5 microns, or from 400 nm to 800 nm for CdSe and CdTe. The nanocrystal has a diameter of less than 150 Å. A population of nanocrystals has average diameters in the range of 15 Å to 125 Å.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

The core can have an overcoating on a surface of the core. The overcoating can be a semiconductor material having a composition different from the composition of the core. The overcoat of a semiconductor material on a surface of the nanocrystal can include a Group II-VI compound, a Group II-V compound, a Group III-VI compound, a Group III-V compound, a Group IV-VI compound, a Group I-III-VI compound, and a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof. For example, ZnS, ZnSe or CdS overcoatings can be grown on CdSe or CdTe nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating can be between 1 and 10 monolayers thick.

The particle size distribution can be further refined by size selective precipitation with a poor solvent for the nanocrystals, such as methanol/butanol as described in U.S. Pat. No. 6,322,901. For example, nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected nanocrystal population can have no more than a 15% rms deviation from mean diameter, preferably 10% rms deviation or less, and more preferably 5% rms deviation or less.

The outer surface of the nanocrystal can include compounds derived from the coordinating solvent used during the growth process. The surface can be modified by repeated exposure to an excess of a competing coordinating group. For example, a dispersion of the capped nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal. Nanocrystal coordinating compounds are described, for example, in U.S. Pat. No. 6,251,303, which is incorporated by reference in its entirety.

More specifically, the coordinating ligand can have the formula:

$$(Y)_{k-n}-X-(L)_n$$

wherein k is 2, 3 or 5, and n is 1, 2, 3, 4 or 5 such that k-n is not less than zero; X is O, S, S=O, $SO_2$, Se, Se=O, N, N=O, P, P=O, As, or As=O; each of Y and L, independently, is aryl, heteroaryl, or a straight or branched $C_{2-12}$ hydrocarbon chain optionally containing at least one double bond, at least one triple bond, or at least one double bond and one triple bond. The hydrocarbon chain can be optionally substituted with one or more $C_{1-4}$ alkyl, $C_{2-4}$ alkenyl, $C_{2-4}$ alkynyl, $C_{1-4}$ alkoxy, hydroxyl, halo, amino, nitro, cyano, $C_{3-5}$ cycloalkyl, 3-5 membered heterocycloalkyl, aryl, heteroaryl, $C_{1-4}$ alkylcarbonyloxy, $C_{1-4}$ alkyloxycarbonyl, $C_{1-4}$ alkylcarbonyl, or formyl. The hydrocarbon chain can also be optionally interrupted by —O—, —S—, —N($R^a$)—, —N($R^a$)—C(O)—O—, —O—C(O)—N($R^a$)—, —N($R^a$)—C(O)—N($R^b$)—, —O—C(O)—O—, —P($R^a$)—, or —P(O)($R^a$)—. Each of $R^a$ and $R^b$, independently, is hydrogen, alkyl, alkenyl, alkynyl, alkoxy, hydroxylalkyl, hydroxyl, or haloalkyl.

An aryl group is a substituted or unsubstituted cyclic aromatic group. Examples include phenyl, benzyl, naphthyl, tolyl, anthracyl, nitrophenyl, or halophenyl. A heteroaryl group is an aryl group with one or more heteroatoms in the ring, for instance furyl, pyiridyl, pyrrolyl, or phenanthryl.

A suitable coordinating ligand can be purchased commercially or prepared by ordinary synthetic organic techniques, for example, as described in J. March, *Advanced Organic Chemistry*, which is incorporated by reference in its entirety.

Transmission electron microscopy (TEM) can provide information about the size, shape, and distribution of the nanocrystal population. Powder X-ray diffraction (XRD) patterns can provide the most complete information regarding the type and quality of the crystal structure of the nanocrystals. Estimates of size are also possible since particle diameter is inversely related, via the X-ray coherence length, to the peak width. For example, the diameter of the nanocrystal can be measured directly by transmission electron microscopy or estimated from X-ray diffraction data using, for example, the Scherrer equation. It also can be estimated from the UV/V is absorption spectrum.

Individual devices can be formed at multiple locations on a single substrate to form a display. The display can include devices that emit at different wavelengths. By patterning the substrate with arrays of different color-emitting materials, a display including pixels of different colors can be formed. In some applications, the substrate can include a backplane. The backplane includes active or passive electronics for controlling or switching power to individual pixels. Include a backplane can be useful for applications such as displays, sensors, or imagers. In particular, the backplane can be configured as an active matrix, passive matrix, fixed format, directly drive, or hybrid. The display can be configured for still images, moving images, or lighting. A lighting display can provide white light, monochrome light, or color-tunable light. See, e.g., U.S. patent application Ser. No. 11/253,612, filed Oct. 21, 2005, which is incorporated by reference in its entirety.

The device can be made in a controlled (oxygen-free and moisture-free) environment, preventing the quenching of luminescent efficiency during the fabrication process. Other multilayer structures may be used to improve the device performance (see, for example, The performance of light emitting devices can be improved by increasing their efficiency, narrowing or broadening their emission spectra, or polarizing their emission. See, for example, Bulovic et al., Semiconductors and Semimetals 64, 255 (2000), Adachi et al., Appl. Phys. Lett. 78, 1622 (2001), Yamasaki et al., Appl. Phys. Lett. 76, 1243 (2000), Dirr et al., Jpn. J. Appl. Phys. 37, 1457 (1998), and D'Andrade et al., MRS Fall Meeting, BB6.2 (2001), each of which is incorporated herein by reference in its entirety. Nanocrystals can be included in efficient hybrid organic/inorganic light emitting devices.

The narrow FWHM of nanocrystals can result in saturated color emission. This can lead to efficient nanocrystal-light emitting devices even in the red and blue parts of the visible spectrum, since in nanocrystal emitting devices no photons are lost to infrared and UV emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of nanocrystals will emit light spanning a narrow range of wavelengths. A device including more than one size of nanocrystal can emit light in more than one narrow range of wavelengths. The color of emitted light perceived by a viewer can be controlled by selecting appropriate combinations of nanocrystal sizes and materials in the device. The degeneracy of the band edge energy levels of nanocrystals facilitates capture and radiative recombination of all possible excitons, whether generated by direct charge injection, energy transfer, or absorption of light.

Devices can be prepared that emit visible or infrared light. The size and material of a semiconductor nanocrystal can be selected such that the nanocrystal emits visible or infrared light of a selected wavelength. The wavelength can be between 300 and 2,500 nm or greater, for instance between 300 and 400 nm, between 400 and 700 nm, between 700 and 1100 nm, between 1100 and 2500 nm, or greater than 2500 nm.

Individual devices can be formed at multiple locations on a single substrate to form a display. The display can include devices that emit at different wavelengths. By patterning the substrate with arrays of different color-emitting semiconductor nanocrystals, a display including pixels of different colors can be formed.

Figure 3A:
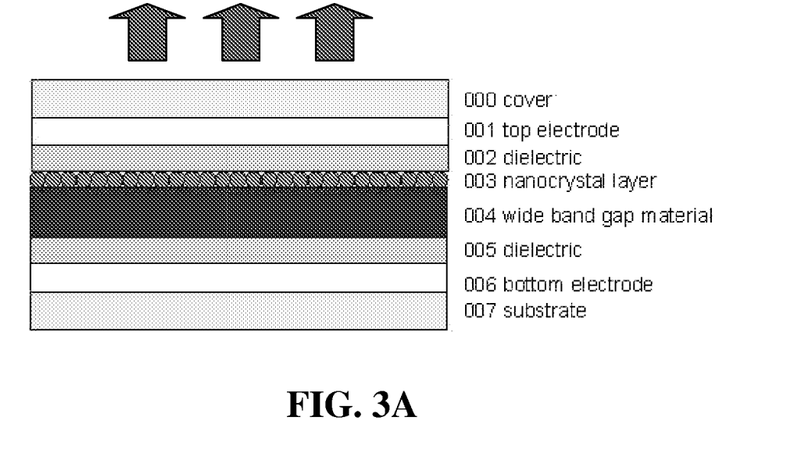
FIGS. 3A-3C are schematic drawings depicting light-emitting devices.

FIG. 3A illustrates a cross-section view of a voltage driven electroluminescent device. In this device, a semiconductor nanocrystal layer 003 (which can be a partial monolayer, monolayer, or multilayer of semiconductor nanocrystals) and a wide band gap material layer 004 are stacked between two insulating layers 002, 005 and two conductive electrodes 001, 006 on a substrate 007. The protection layer 000, conductive layer 001 and insulating layer 002 are transparent to allow light generated in the wide band gap material layer 004 and in the semiconductor nanocrystal layer 003 to exit the device. Alternatively, light can exit the substrate side, provided that the bottom electrode and the substrate are transparent.

According to this construction, the voltage driven nanocrystal electroluminescent device includes a light emission layer including nanocrystals and wide band gap material (such as zinc sulfide) between two insulating layers and conductive electrodes. A voltage is applied across the two conductive electrodes to electrically drive and excite the wide band gap materials; the excitation energy is released either by emitting photons or by transferring energy to the nanocrystal layer. Thus, the nanocrystal layer serves as an energy conversion layer to directly or indirectly convert electrical energy to photon energy. Light associated with nanocrystal's energy structure is emitted as a result of energy conversion within the nanocrystal layer. Consequently, one can engineer the nanocrystal size or composition to achieve light emission of red, green or blue colors, or a combination of colors, and still maintain the chemical composition of the wide band gap material unchanged.

Figure 3B:
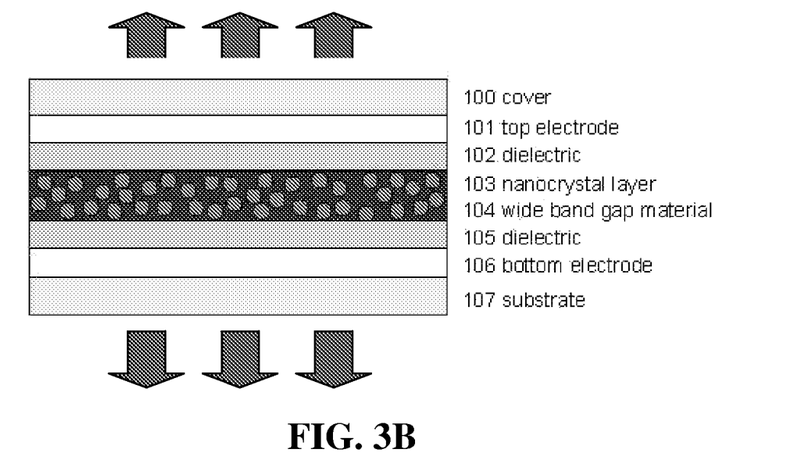

FIG. 3B shows an alternative construction of a voltage driven nanocrystal electroluminescent device. Here, semiconductor nanocrystals 103 are dispersed in a matrix of wide band gap materials 104 between two insulating layers 102, 105 and two conductive electrodes 101, 106 on a substrate 107. Lights from the mixed nanocrystal layer and wide band gap material layer are extracted from the top side and/or bottom side.

Figure 3C:
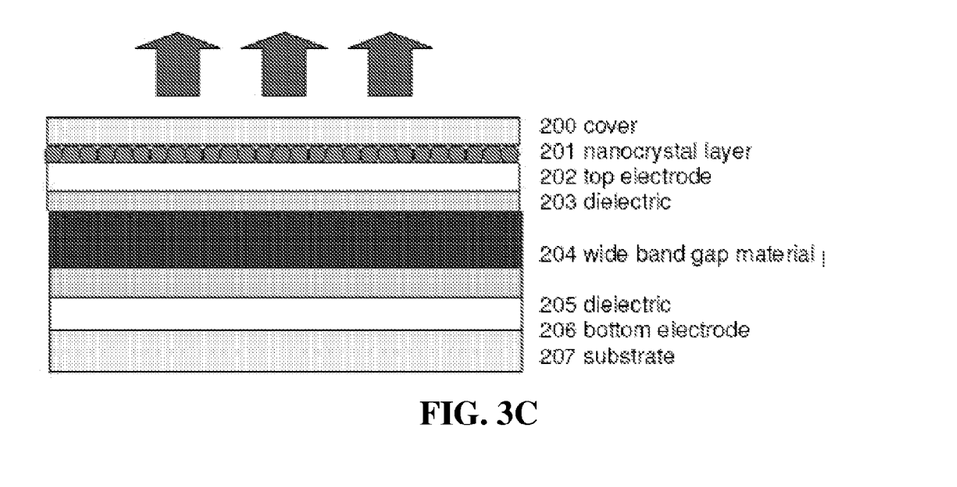

FIG. 3C shows an alternative construction of a voltage driven nanocrystal electroluminescent device. Here, semiconductor nanocrystals 201 are located in a region outside top electrode 202, dielectric 203, wide band gap materials 204, dielectric 205, electrode 206 and substrate 207. Nanocrystals 201 can optionally be protected by a cover 200 (not necessarily present). Light from the wide band gap material layer can excite the nanocrystals by energy transfer or reabsorption.

In the voltage driven nanocrystal electroluminescent device, an insulating layer such as silicon oxide is formed on a substrate (such as a silicon substrate) by thermally oxidizing the silicon surface. The wide band gap material, for example zinc sulfide, can be cast or sputtered on top of the insulating layer. Then nanocrystal solution can be deposited (e.g., by spin casting, inkjet printing, microcontact printing, or drop casting) on top of the zinc sulfide layer. Alternatively, the wide band gap material (such as a polymer) and the nanocrystals can be dissolved together in a solvent. See, for example, U.S. patent application Ser. No. 10/400,907, filed Mar. 28, 2003, which is incorporated by reference in its entirety. Examples of suitable solvents include chloroform and THF. The solution of wide band gap material and nanocrystals can then be deposited. A layer of polymer, for example, polymethylmethacrylate (PMMA) can be used as the second insulating material above the nanocrystal layer. The top electrode and protection layer can be provided by an indium tin oxide (ITO) coated glass slide.

To form a device, a transparent electrode (such as ITO) can be arranged on a transparent substrate. Then, semiconductor nanocrystals are deposited using a large-area compatible, single monolayer deposition technique such as micro-contact printing or a Langmuir-Blodgett (LB) technique. Subsequently, an n-type semiconductor (e.g., ZnO or $TiO_2$) is applied, for example by sputtering, on top of this layer. A metal electrode can be thermally evaporated over this to complete the device. More complicated device structures are also possible. For example, a lightly doped layer can be included proximal to the nanocrystal layer, to minimize non-radiative losses due to exciton quenching by unbound charge carriers in the transport layers.

The device can be assembled by separately growing the two transport layers, and physically applying the electrical contacts using an elastomer such as polydimethylsiloxane (PDMS). This avoids the need for direct deposition of material on the nanocrystal layer.

The device can be thermally treated after application of all of the transport layers. The thermal treatment can further enhance injection of charges into the nanocrystals, as well as eliminate the organic capping groups on the nanocrystals. The instability of the capping groups can contribute to device instability.

The applied voltage used for light generation can be an AC voltage or DC voltage. A DC voltage can be supplied by DC voltage generator, including, for example, a battery, a capacitor, or a rectified AC voltage. An AC voltage can be supplied by an AC voltage generator which produces a voltage waveform, such as, for example, a square wave. The waveform can have a frequency of between 10 Hz and 1 MHz, 250 Hz and 100 kHz, or 500 Hz and 10 kHz. The average voltage can be between 2 and 10 volts, or 3 and 8 volts. The percentage of duty cycle used is the calculated as one hundred multiplied by the average voltage divided by the maximum voltage. The percentage of duty cycle is the relative time in an on/off cycle (in %) during which the voltage is on. The frequency, duty cycle, and peak voltage can be adjusted to optimize light output and stability from the device. Some applications of a duty cycle are described, for example, in G. Yu et al. Applied Physics Letters 73:111-113 (1998), incorporated herein by reference in its entirety. For example, the AC voltage waveform can be a 50% duty cycle at 5 V and 1 kHz, which has a maximum voltage of 5 volts, a frequency of 1 kHz, and an average voltage of 2.5 volts. In this way, a low average operating voltage can improve the operating half-lives of the devices.

A display unit can be made using such electroluminescent devices comprising a layer including a nanocrystal layer and wide band gap material between two insulating layers and conductive layers, wherein the light emitting layer generating light of different colors is formed by choosing and patterning nanocrystal layers of desired energy structure and composition. Thus, a multicolor display can be realized.

Figure 4:
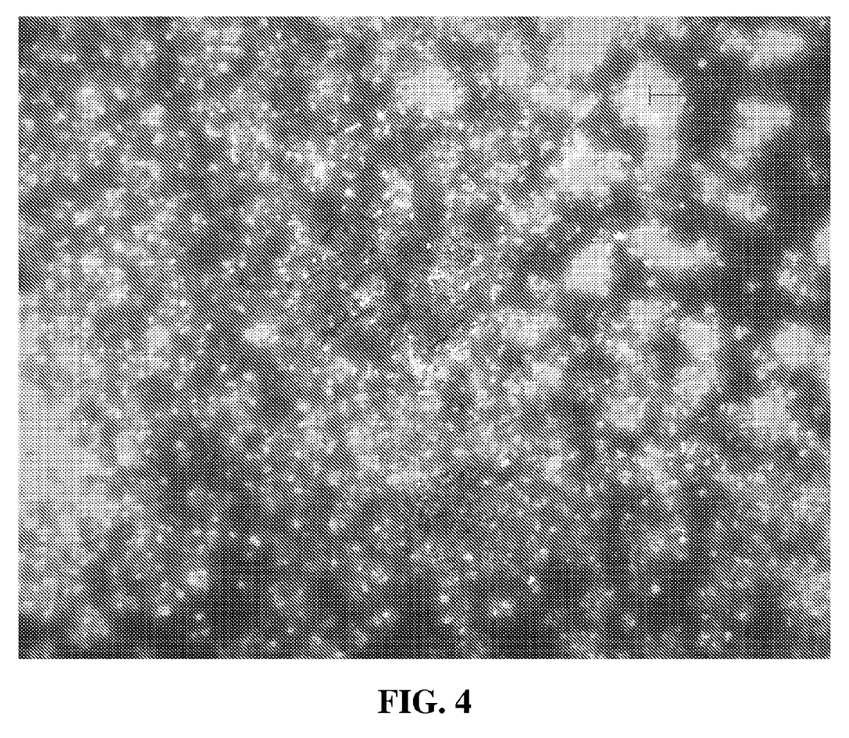
FIG. 4 is a color photograph showing light emission from a light-emitting device.

FIG. 4 is a color photograph showing emission from an electroluminescent device. Both blue-colored emission from a ZnS electroluminescent material and red emission from semiconductor nanocrystals were observed.

Figure 5A:
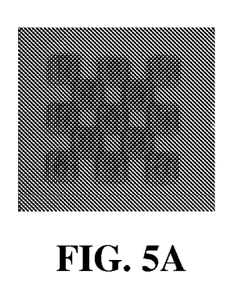
FIGS. 5A and 5B are color photographs of a light emitting device in the off and on states, respectively.
Figure 5B:
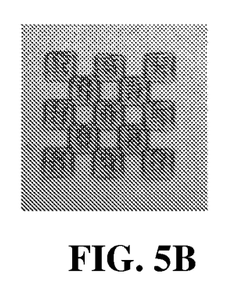

FIGS. 5A and 5B are color photographs showing an electroluminescent device in the off and on states, respectively (i.e., without an applied voltage, and with an applied voltage). The device included a ZnS electroluminescent material and red-emitting semiconductor nanocrystals deposited in a "chessboard" pattern having squares 1 mm on a side. When an alternating voltage was applied, the blue emission from the ZnS material was observed, as was red emission arising from the semiconductor nanocrystals.

Other embodiments are within the scope of the following claims.

What is claimed is:

1. A voltage-driven light emitting device comprising:
a first electrode;
a second electrode;
an electroluminescent material including a wide band gap inorganic material;
an insulating dielectric material disposed between the electroluminescent material and the first electrode, wherein the insulating dielectric material prevents current from passing between electroluminescent material and the first electrode;
an insulating dielectric material disposed between the electroluminescent material and the second electrode, wherein the insulating dielectric material prevents current from passing between electroluminescent material and the second electrode; and
a plurality of semiconductor nanocrystals adjacent to and in contact with the electroluminescent material and arranged to receive energy from the electroluminescent material, wherein the quantum efficiency of the semiconductor nanocrystals is greater than 30%, and wherein the plurality of semiconductor nanocrystals are arranged in a layer.

2. The light emitting device of claim 1, wherein the plurality of semiconductor nanocrystals is disposed between the first electrode and the second electrode.

3. The light emitting device of claim 1, wherein the electroluminescent material is arranged in a layer.

4. The light emitting device of claim 1, wherein the plurality of semiconductor nanocrystals are selected to emit a single color of light.

5. The light emitting device of claim 1, wherein the plurality of semiconductor nanocrystals are selected to emit more than one different colors of light.

6. The light emitting device of claim 5, wherein the plurality of semiconductor nanocrystals are selected to emit white light.

7. The light emitting device of claim 1, wherein the plurality of semiconductor nanocrystals are selected to emit visible light.

8. The light emitting device of claim 1, wherein the plurality of semiconductor nanocrystals are selected to emit infrared light.

9. A method of forming a device, comprising:
depositing an insulating dielectric material over a first electrode;
depositing an electroluminescent material including a wide band gap inorganic material over the first electrode;
depositing of a plurality of semiconductor nanocrystals in an arrangement adjacent to and in contact with the electroluminescent material to receive energy from the electroluminescent material, wherein the quantum efficiency of the semiconductor nanocrystals is greater than 30%, and wherein the plurality of semiconductor nanocrystals are arranged in a layer; and
arranging a second electrode over the first electrode, the insulating dielectric material, the electroluminescent material, and the plurality of semiconductor nanocrystals;
wherein the insulating dielectric material is disposed between the electroluminescent material and the first electrode, wherein the insulating dielectric material prevents current from passing between electroluminescent material and the first electrode, and the insulating dielectric material is disposed between the electroluminescent material and the second electrode, wherein the insulating dielectric material prevents current from passing between electroluminescent material and the second electrode.

10. The method of claim 9, wherein the depositing of the plurality of semiconductor nanocrystals in an arrangement to receive energy from the electroluminescent material includes depositing the nanocrystals over the first electrode.

11. The method of claim 9, wherein depositing the electroluminescent material includes forming a layer.

12. The method of claim 9, wherein the insulating dielectric material is arranged in at least one layer adjacent to the electroluminescent material.

13. The method of claim 9, wherein the plurality of semiconductor nanocrystals are selected to emit a single color of light.

14. The method of claim 9, wherein the plurality of semiconductor nanocrystals are selected to emit more than one different colors of light.

15. The method of claim 13, wherein the plurality of semiconductor nanocrystals are selected to emit white light.

16. A method of generating light comprising:
providing a device including a first electrode; a second electrode; an electroluminescent material including a wide band gap inorganic material; an insulating dielectric material disposed on both sides of the electroluminescent material, wherein the insulating dielectric material prevents current from passing between electroluminescent material and the first electrode and wherein the insulating dielectric material prevents current from passing between the electroluminescent material and the second electrode; and a plurality of semiconductor nanocrystals adjacent to and in contact with the electroluminescent material and arranged to receive energy from the electroluminescent material, wherein the quantum efficiency of the semiconductor nanocrystals is greater than 30%, and wherein the plurality of semiconductor nanocrystals are arranged in a layer; and
applying a voltage-driven light-generating potential across the first electrode and the second electrode.

17. The method of claim 16, wherein the plurality of semiconductor nanocrystals is disposed between the first electrode and the second electrode.

18. The method of claim 16, wherein the electroluminescent material is arranged in a layer.

19. The method of claim 18, wherein the insulating dielectric material is arranged in at least one layer adjacent to the electroluminescent material.

20. The method of claim 16, wherein the plurality of semiconductor nanocrystals are selected to emit a single color of light.

21. The method of claim 19, wherein the plurality of semiconductor nanocrystals are selected to emit a single color of light.

22. The method of claim 16, wherein the plurality of semiconductor nanocrystals are selected to emit more than one different colors of light.

23. The method of claim 16, wherein the plurality of semiconductor nanocrystals are selected to emit white light.

24. The method of claim 16, wherein the plurality of semiconductor nanocrystals are selected to emit visible light.

25. The method of claim 16, wherein the plurality of semiconductor nanocrystals are selected to emit infrared light.

26. The device of claim 1, wherein the wide band gap inorganic material is zinc sulfide.

* * * * *